Aug. 26, 1947.                L. MACKTA                 2,426,228
                            SPEED INDICATOR
                          Filed Oct. 31, 1942

INVENTOR
LEO MACKTA
BY William B. Hall
ATTORNEY

Patented Aug. 26, 1947

2,426,228

UNITED STATES PATENT OFFICE 2,426,228

SPEED INDICATOR

Leo Mackta, United States Army, Brooklyn, N. Y.

Application October 31, 1942, Serial No. 464,103

11 Claims. (Cl. 250—1.56)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to speed indicators. More particularly it relates to an improved means and method for determining the speed and the drift of a body moving relative to a surface by means of electromagnetic energy.

The main object of my invention is to provide a more accurate means and method for electromagnetically determining the speed and the drift of a moving aircraft relative to the surface of the earth, which determines are made from within the aircraft.

Another object of my invention is to provide an aircraft speed and drift indicator of the electromagnetic type, wherein negligible error is introduced by changes in the longitudinal attitude of the aircraft through small angles.

Other objects and adavntages will become apparent upon reading the following specification and the accompanying drawings, in which a preferred embodiment of the invention is described and shown.

The present embodiment of my invention employs the principles of the well known "Doppler" effect and, broadly, consists in projecting from an aircraft two beams of high frequency radio waves in divergent downward directions to the earth, receiving reflected components for use as a factor in the determinations of the speed of the aircraft.

Figure 1:
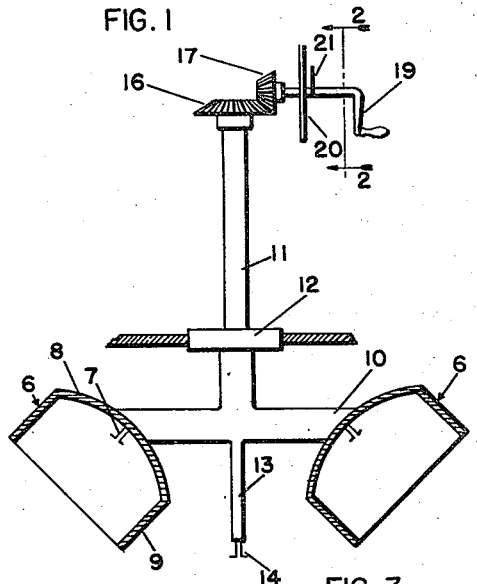
Fig. 1 is a side view partly in section, of the beam projectors and receiving antenna and the adjusting means connected therewith.
Figure 2:
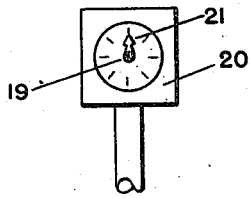
Fig. 2 is a sectional view along line 2—2 of Fig. 1.
Figure 3:
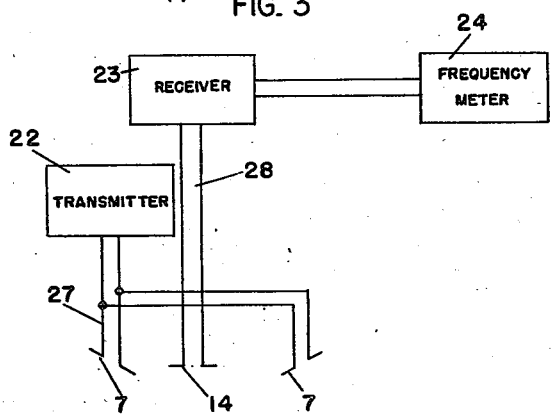
Fig. 3 is a diagrammatic view illustrating the electrical components of the present device.
Figure 4:
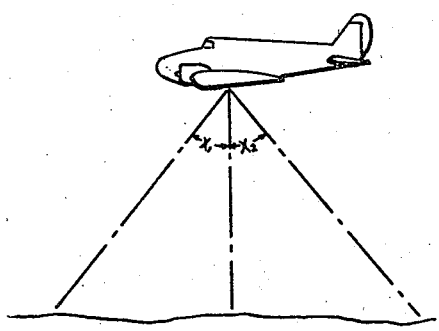
Fig. 4 is a side view of an aircraft proceeding in a horizontal direction and projecting beams of electromagnetic energy toward the surface of the earth.
Figure 5:
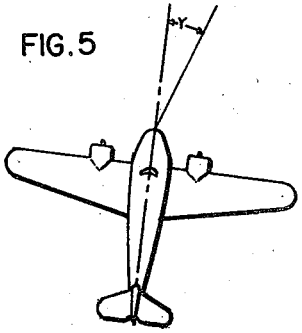
Fig. 5 is a plan view of an aircraft proceeding at an angle "Y" to the longitudinal axis of the vessel.

The apparent frequency difference between a wave transmitted from a moving object to a relatively stationary surface and the reflected wave received by said moving body is given by the formula:

$$f = \frac{2FV}{C} \sin X \cos Y$$

wherein, $f$ = apparent frequency difference between the transmitted and received waves,
$F$ = frequency of the transmitted wave,
$V$ = speed of the moving body in the direction of flight,
$C$ = velocity of propagation of radio waves in space,
$X$ = angle between projected beam and the vertical as shown in Fig. 4, and
$Y$ = angle between the line of flight and the horizontal component of the projected beam.

On the other hand, when two beams are projected in divergent directions, the apparent frequency difference between their received reflected components is given by the following formula:

$$f = \frac{2FV}{C}(\sin X_1 \cos Y_1 + \sin X_2 \cos Y_2)$$

where subscript 1 designates one beam and subscript 2 designates the other beam.

A study of the above formulae discloses that:

1. When two beams are employed, the frequency difference between their received reflected components is twice as much as the frequency difference between the reflected component of one beam and the transmitted beam.

2. When $Y=0$, $f$ is a maximum and when $Y=90°$, $f$ is equal to 0.

3. When there is a small angular change in the longitudinal attitude of the plane, appreciable error is introduced when a single beam is employed, whereas this error is negligible when two beams are employed. For example, with $X$, $X_1$ and $X_2$ normally 45° to the vertical, when the direction of flight and the longitudinal axis of the plane coincide, and there should thereafter be an angular change of 5° in the longitudinal attitude of the plane, i. e., the vertical angle between the line of flight and the longitudinal axis is 5°, the percentage error introduced in the case of a single beam would be substantially equal to $$\frac{\sin 45° - \sin 40°}{\sin 45°}$$

which is greater than 9%. However, in case two beams are used the percentage error introduced would be substantially equal to $$\frac{2 \sin 45° - (\sin 40° + \sin 50°)}{2 \sin 45°}$$

which is less than 1%.

Referring again to the drawings, 6 designates a means for projecting or radiating a sharply defined beam of ultra high frequency radio waves, and consists of a dipole 7, parabolic reflector 8, and shielding means 9. The purpose of the shielding means 9 is to reduce to a negligible minimum the direct pickup of the transmitted wave by the receiving antenna 14. There are two such projecting means, each positioned on an opposite end of a crossarm 10 rigidly mounted on a rotatable shaft 11 supported by a bearing member 12. The angles of projection between each radiating means 6 and the vertical shaft 11 are preferably equal and of about 45°. Depending from the crossarm 10 is an extension 13 co-axial with shaft 11 and terminating in the receiving dipole 14. A nondirectional antenna or, any antenna which will receive reflected components of the projected beams, may be used.

Positioned at the upper end of shaft 11 and keyed thereto is a bevel gear 16 which meshes with a bevel gear 17. The bevel gear 17 is fixedly mounted upon the shaft of a crank member 19. The shaft of the crank member 19 passes rotatably through the center of a dial plate 20 and has fixed thereto an indicating pointer 21. The dial is so calibrated as to indicate the angle between the longitudinal axis of the aircraft and the horizontal component of the projected beam.

The dipoles 7 are connected by means of suitable transmission lines 27 to a transmitter 22, which is primarily an ultra-high frequency current generator. Similarly, the receiving dipole 14 is connected by means of a suitable transmission line 28 to the input of a receiver 23 tuned broadly enough to receive both reflected components. The receiver is of any well known type adapted to receive two different frequencies, mix, filter, and amplify the resultant beat frequency. The beat frequency output of receiver 23 is fed to a frequency meter 24 of any well known type which measures the beat frequency of the received components of the projected beams. The dial of the frequency meter may be calibrated in miles per hour. The entire combination is suitably mounted in any convenient part of the aircraft.

The device above described operates as follows:

The transmitter 22 energizes the dipoles 7 thus causing the projectors 6 to radiate beams of ultra-high frequency radio waves to the surface of the earth. The receiving antenna 14 receives only the reflected components of said waves which are thereafter fed to the receiver 23. Receiver 23 heterodynes the received components and amplifies the beat frequency of said received components, and the frequency meter 24 measures said beat frequency and translates it by calibration into miles per hour. The beams are rotated about a vertical axis by manipulation of the crank 19 until the frequency meter 24 indicates the greatest beat frequency at which point the azimuth of the beams coincides with the true course of the aircraft. The reading on dial 20 will then indicate the angle between the longitudinal axis of the aircraft and the true course thereof, which angle, in combination with the true speed of the aircraft as read on the frequency meter at maximum beat frequency, may be used to calculate the drift of the aircraft in miles per hour.

I have shown a preferred embodiment of my invention but it is obvious that numerous changes and omissions may be made without departing from the spirit and scope of my invention. For example, the projector has been shown as comprising a dipole and a parabolic reflector but it should be understood that any type of beam projector may be used such as an electromagnetic wave horn.

I claim:

1. The method of determining the relative speed between an object and a surface, which comprises simultaneously transmitting a plurality of divergent beams of electromagnetic energy from the object to the surface, receiving only the reflected components of said beams concurrently with said transmission, and combining said components to derive a resultant thereof for use in the determination of the said relative speed.

2. The method of determining the relative speed between an object and a surface, which comprises simultaneously transmitting a pair of divergent beams of electromagnetic energy of a definite frequency from the object to the surface, receiving only the reflected components of said energy concurrently with said transmission, and determining the difference in frequency of said received components as an indication of said relative speed.

3. The method of determining the relative speed between a moving aircraft and the earth, which comprises simultaneously transmitting a pair of beams of electromagnetic waves from the aircraft to the surface of the earth, said beams forming predetermined angles with a vertical axis of the aircraft and projecting in divergent directions, receiving only the reflected components of said beam concurrently with said transmission, and determining the difference in frequency between said received components as an indication of relative speed.

4. A method as claimed in claim 3 wherein the angles of the projected beams with said vertical axis of the aircraft are equal.

5. The method of determining the true direction of motion of a moving aircraft relative to the earth, which comprises simultaneously transmitting a pair of beams of electromagnetic waves from said aircraft to the earth, said beams forming a predetermined angle with each other, receiving only the reflected components of said beams concurrently with said transmission, determining the frequency difference between said received components, changing the direction of the horizontal component of said beams, and noting the change in frequency difference.

6. A speed indicator for aircraft, comprising means for simultaneously transmitting a pair of divergent beams of electrical energy against a surface, means for receiving only the reflected components of said beams concurrently with said transmission, and means for translating the received components into an indication of the speed of said aircraft.

7. A speed indicator for aircraft, comprising means for simultaneously transmitting a pair of divergent beams of electromagnetic energy of a definite frequency to the surface of the earth, means for receiving only the reflected components of said beams concurrently with said transmission, and means for measuring the frequency difference between the received components as an indication of the speed of said aircraft.

8. A speed and drift indicator for aircraft, comprising means for simultaneously transmitting a pair of beams of electromagnetic waves to the surface of the earth, said beams projecting in opposite directions and forming an angle with a vertical axis of the plane, means for receiving only the reflected components of said beams concurrently with said transmission, means for determining the apparent difference in frequency between the received components, means for changing the direction of the horizontal component of the projected beams, and means for indicating the angle between a horizontal axis of the aircraft and said horizontal component.

9. A speed and drift indicator for aircraft, comprising in combination, a pair of radiators adapted to emit sharply defined beams of electromagnetic waves, said radiators being rotatably mounted about a vertical axis of said aircraft, a non-directional receiving antenna positioned between said radiators and shielded therefrom, means for rotating said radiators about said vertical axis, means for determining the angle between the horizontal direction of said radiators and a horizontal axis of said aircraft, means for simultaneously energizing said radiators, a receiver connected to said receiving antenna and adapted to heterodyne the reflected components of the radiated beams, and a frequency meter connected to the output of said receiver for measuring the heterodyne frequency.

10. That method of determining the true course of a moving aircraft relative to the earth, which comprises simultaneously transmitting a divergent pair of beams of electromagnetic waves from said aircraft to the earth, rotating said beams in azimuth, receiving only the reflected components of said beams concurrently with said transmission, and determining the angle between a horizontal axis of the aircraft and the horizontal components of said beams at the point where the frequency difference between the received components of said beams is a maximum.

11. A speed indicator for aircraft comprising, in combination, a pair of radiators adapted to transmit sharply defined beams of electromagnetic waves forming equal and opposite acute angles with a vertical axis of said aircraft, means for simultaneously energizing said radiators, means including a single antenna for receiving only the reflected components of both of said beams concurrently with said transmission, and means responsive to the frequencies of the reflected components to indicate the speed of said aircraft.

LEO MACKTA.

REFERENCES CITED

The following references are of record in the file of this patent:

UNITED STATES PATENTS

| Number | Name | Date |
| --- | --- | --- |
| 2,223,224 | Newhouse | Nov. 26, 1940 |
| 1,864,638 | Chilowsky | June 28, 1932 |